(No Model.) 2 Sheets—Sheet 1.
J. T. BRIGHT.
WEIGHING AND PRICE SCALES.
No. 427,829. Patented May 13, 1890.
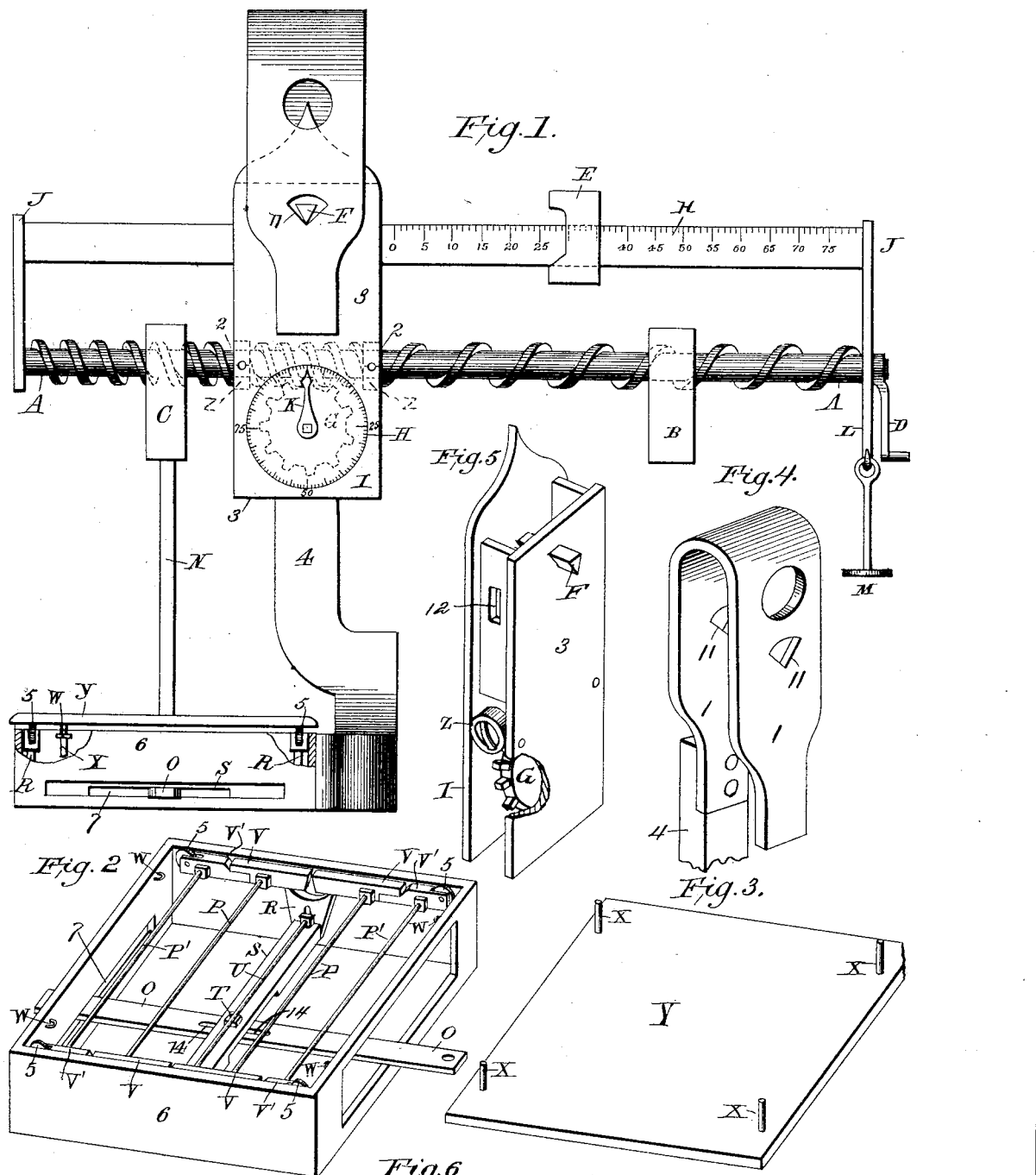

(No Model.) 2 Sheets—Sheet 2.
J. T. BRIGHT.
WEIGHING AND PRICE SCALES.
No. 427,829. Patented May 13, 1890.
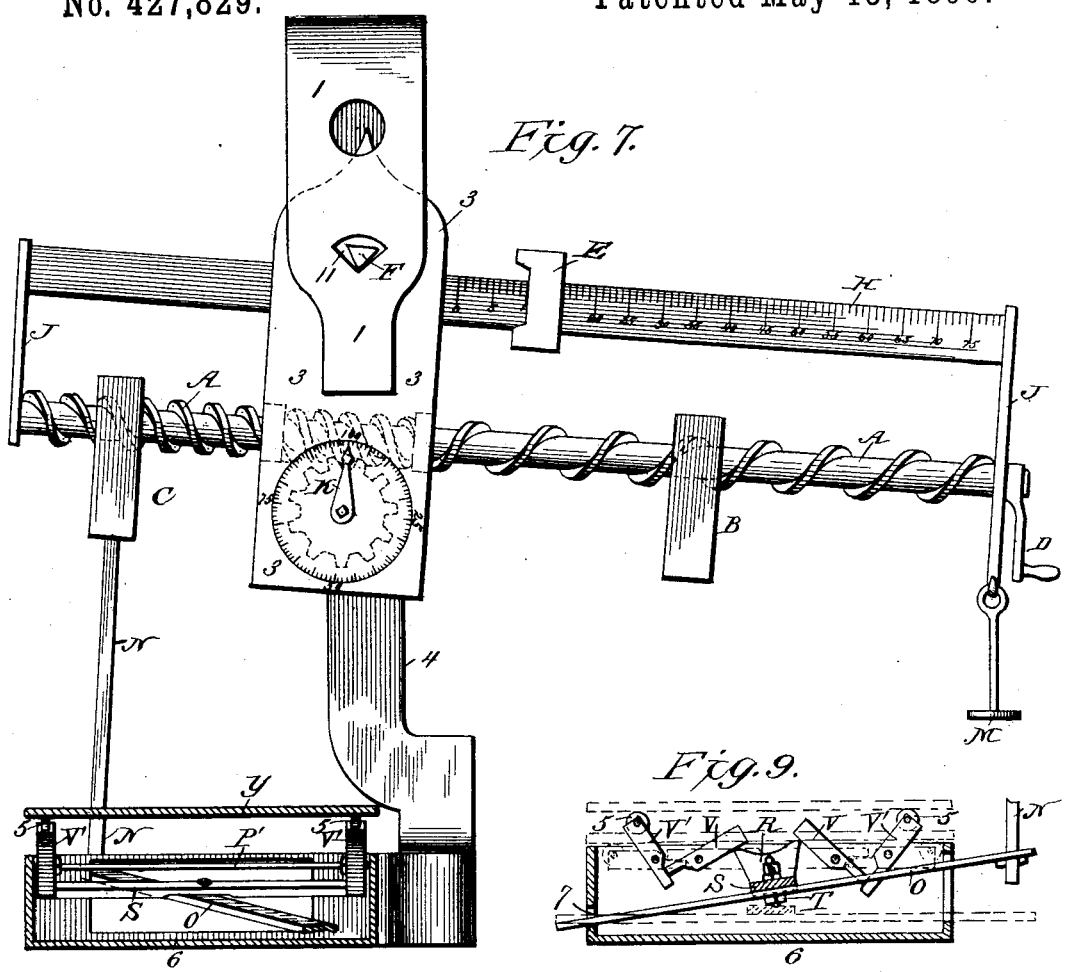
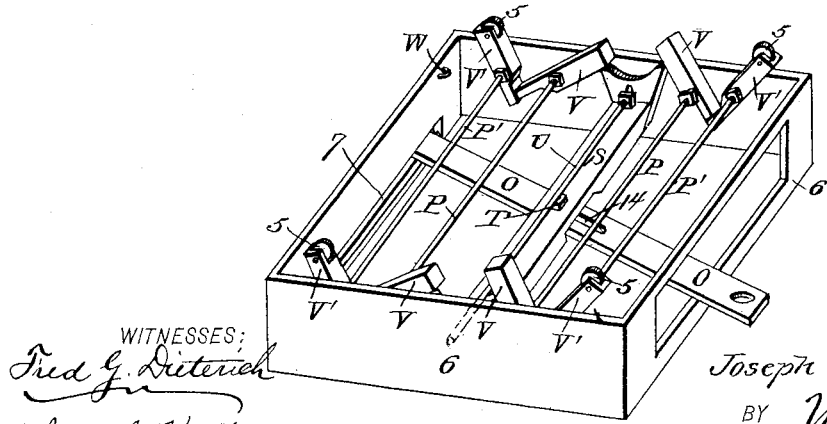
WITNESSES:
Fred G. Dieterich
Amos W. Hart
INVENTOR:
Joseph T. Bright
BY Munn & Co
ATTORNEYS

UNITED STATES PATENT OFFICE.

JOSEPH T. BRIGHT, OF LEXINGTON, KENTUCKY.

WEIGHING AND PRICE SCALES.

SPECIFICATION forming part of Letters Patent No. 427,829, dated May 13, 1890.

Application filed August 28, 1889. Serial No. 322,270. (No model.)

*To all whom it may concern:*

Be it known that I, JOSEPH T. BRIGHT, of Lexington, in the county of Fayette and State of Kentucky, have invented a new and useful Improvement in Weighing and Price Platform-Scales, of which the following is a specification.

The invention is an improvement in the class of so-called "counter platform-scales" adapted to indicate weight and price of the article sold, and which are particularly designed for use of grocers and other provision-dealers who sell small quantities of goods by weight. I employ a tilting graduated beam, which is connected with a lever arranged under the platform of the scale and operates other levers whereon the platform always rests. When the long arm of said beam is depressed by sliding a weight along it, the platform is raised, and when the platform is depressed the beam is raised to its former position, the depression of the platform being effected by placing on it the quantity, in weight, of the article or commodity the purchaser desires. The weight that slides on the graduated beam is adjusted at any desired point to indicate the value in money of the quantity of the article the purchaser desires—say ten cents' worth—and a dial pointer or index is adjusted by a rotary screw (or screw-threaded rod) to indicate the amount of such article in pounds.

In accompanying drawings, two sheets, Figure 1 is a side elevation of my improved scale, part of the base of the scale being broken out. Fig. 2 is a perspective view of the base of the scale, the top being removed. Fig. 3 is a perspective view of the platform proper or top of the base inverted. Fig. 4 is a perspective view of the bail-piece forming the top portion of the standard. Fig. 5 is a perspective view of the swinging hanger in which the graduated beam is supported and slides. Fig. 6 is an end view of one of the boxes which support the screw-rod in the hanger. Fig. 7 is mainly a side view and in part a vertical section of the scale, showing the position of its parts when in use for weighing. Fig. 8 is a perspective view of the base portion of the scale, the top being removed and the movable parts shown in the position they assume in the operation of weighing. Fig. 9 is a vertical section of the same parts shown in Fig. 8.

I will first indicate the main parts and features of the scale before describing details.

The short vertical standard 4 is constructed integrally (as is usual) with the hollow rectangular base 6, on which the vertically-movable platform Y is arranged. A U-shaped bail-piece 1 (see especially Fig. 4) is rigidly attached to the top of the standard 4 and provided with opposite apertures 11 to receive the knife-edged bar F, Figs. 1 and 5, of the hanger 3. The beam H slides in side apertures 12 (see Fig. 5) in said hanger 3, and the screw A works in boxes Z, which are pivoted in the lower portion of the hanger. The right-hand portion of the screw has a very coarse thread, and the left-hand portion has a somewhat finer thread which runs in the opposite direction. Said beam H and screw A are rigidly connected at their ends by means of bars J, and a crank D is fixed on the screw for use in rotating it. Weights B and C, that balance each other, are placed on the screw A, and from the weight C depends a rigid bar N, which is loosely connected with a lever O, that works (in both vertical and horizontal planes) in the platform-base 6. Said lever O serves to raise a bar S, Figs. 1, 2, 7, and 9, which has vertical slotted end pieces or arms R, that act on and operate two sets of compound levers V V', which support the platform Y. The tilting downwardly of the graduated end of beam H necessarily raises the weight C, and with it the bar N, Fig. 7, thus raising the end of lever O, to which said bar N is attached. The lever O in turn raises the cross-bar S, and thereby tilts the levers V V' into the position shown in Figs. 8 and 9, and raises the platform Y. The latter falls, and all the other parts also resume the position shown in Figs. 1 and 2, when the quantity (in weight) of the article being sold placed on the platform balances the sliding weight E on the beam J.

I will now describe details of construction, and finally state the operation of the scale as a whole. The longer arm or right-hand portion of the beam H is graduated to indicate price in cents—from one to seventy-five, inclusive. The weight E slides thereon in the usual way. Whenever the weight E is not sufficient, then slotted weights are placed on the usual hinged and pendent carrier M. The beam H slides freely through the hanger 3, Figs. 1 and 6, but is otherwise immovably connected with it. The screw or screw-rod A works in internally-threaded boxes Z, Fig. 6, having lateral journals that work in the sides of the hanger 3, and they (the boxes) are provided with a hinged portion that enables the screw to be easily and quickly placed in or removed from them. The hanger 3 is made of two parallel plates held rigidly separated by connecting strips or blocks. The screw A meshes with and operates a cog-gear G, Figs. 1, 5, and 7, which is journaled in the lower portion of the hanger 3, and on the extended axis of this gear is fixed an index or pointer K, that moves over a dial inscribed on one of the outer faces of the hanger, Figs. 1 and 7. The circle of the dial is divided to indicate quarters of cents, (one cent to one hundred cents, inclusive.) A knife-edged bar F passes through the hanger 3, perpendicular to its sides, and rests in the apertures 11, formed in the bail-piece 1. By rotating the screw A the balance-weights B C are moved simultaneously toward or from each other, and, whatever their adjustment may be, they exactly balance, and thus hold the screw A and beam H normally horizontal. The vertical bar N has a tenon that fits loosely in a hole in one end of the lever O, and is prevented from being drawn out of the same by any suitable means, such as a cross-pin, Fig. 9. The lever O passes through horizontal slots in the base 6. It will be noted that the slot 7 is the smaller, and that its lower side is knife-edged and forms a fulcrum for one end of lever O. The latter is free to move vertically at its apertured end and laterally at both ends.

A lengthwise slot 14, Figs. 2 and 8, in the lever O provides for the required connection of the same with the cross-bar S by means of a screw-bolt T. The rigid vertical fan-shaped arms R of bar S are also slotted lengthwise to allow the rod U, Figs. 2 and 8, to pass through them and enter the adjacent side of the base. This rod U serves to prevent lateral movement or displacement of the arms R while being raised or depressed, as hereinafter described. There are two similar sets of compound levers at each side (or end) of the base 6, and both are normally horizontal and aligned. The inner levers V are pivoted on transverse parallel rods P, and the outer levers V' on rods P', which are parallel to the former P. The inner ends of the levers V V rest on the arms R R, and their outer ends work in contact with the rabbeted inner ends of the outer levers V' V'. A friction-roller 5 is mounted in the outer end of each of the latter V', and they constitute bearing-points for the platform Y.

I will now describe the operation of the scale. As a practical example, suppose a customer desires ten cents' worth of tea, and it is selling at one dollar per pound. The dealer rotates the crank D until the index K points to 100 on the dial—that being the price in cents of the tea per pound. Simultaneously with this rotation of the screw A the weights B and C are moved along it, and, the bar N being carried with the weight C, the apertured end of lever O is moved laterally to a corresponding distance, so that it lies diagonal to the bar S, as shown in Figs. 7 and 8. Then the dealer slides the weight E along the beam H to the number 10, Fig. 7, to indicate ten cents' worth of the article, (tea.) By these changes the equilibrium is destroyed, and the beam H is thereby tilted, and the apertured end of the lever O raised correspondingly, its other end resting on the knife-edged fulcrum. The lever O in turn raises the bar S and its arms R, and thus the sets of levers V V' are tilted into the position shown in Figs. 7, 8, and 9, and the platform Y raised accordingly. When the required quantity of tea—ten cents' worth—shall have been placed on said platform, it will depress the levers V V' to their normal alignment, Fig. 1, and also carry the lever O, the bar N, the beam H, and screw A back to their former horizontal position. In other words, ten cents' worth of the tea will balance the weight E, (at the graduation 10,) and thus restore the parts to the balanced position. Again, suppose coffee is twenty cents per pound and a customer will purchase five dollars' worth. Proceed as before—i. e., turn the crank until the index points to 20, indicating the price per pound, and place weights (which are suitably marked) on the carrier M to the amount or total five dollars. The aggregate number of pounds will be twenty-five. Said weights will of course tilt the beam H, raise the weight C, bar N, lever O, and bar S, and tilt the levers V V', and thus elevate the platform Y, as before. Then put coffee on the platform Y until it balances the scale, and it will be the required amount at the required price—namely, twenty-five pounds.

What I claim is—

1. The combination of the sliding graduated beam bearing a sliding weight to indicate a certain value of the article to be purchased, a screw and balance-weights thereon which are entirely independent of the aforesaid weight on the beam, a swinging hanger in which said beam and screw work, a vertically-movable platform and its base, and a system of levers contained in the latter and supporting said platform, and means for connecting such levers and the aforesaid screw, whereby the tilting of the beam and screw effects a corresponding change in the position of the platform and its supporting-levers, as and for the purpose specified.

2. The combination of the beam H, weight E, screw A, swinging hanger 3, balance-weights B C, gear G, index and dial, the bar N, pendent from weight C, the platform Y, and a system of levers for supporting it and connected with said bar, as shown and described, to operate as specified.

3. The combination, with the slotted base and its platform, of the sets of pivoted aligned levers V V', the vertically-movable cross-bar S, having arms R, the sliding and tilting lever O, a bar N, connected with one end of the latter, the graduated beam H, parallel screw A, swinging hanger 3, the weights B C, gear G, index, and dial, all arranged and operating as specified.

4. The swinging hanger 3, bearing a dial, the gear G, journaled in the hanger, the index K, fixed on the journal of said gear and moving over the dial, a rotating screw which meshes with the gear and travels endwise in boxes arranged in the hanger, a vertically-movable platform and a system of levers for supporting and elevating it, and means for connecting said screw and levers, substantially as shown and described.

JOSEPH T. BRIGHT.

Witnesses:
W. T. BRIGHT,
FRANK GILMORE.